(12) United States Patent
Rosenberg et al.

(10) Patent No.: US 10,623,576 B2
(45) Date of Patent: *Apr. 14, 2020

(54) HANDLING CONFERENCES USING HIGHLY-DISTRIBUTED AGENTS

(71) Applicant: Cisco Technology, Inc., San Jose, CA (US)

(72) Inventors: Jonathan D. Rosenberg, Freehold, NJ (US); Keith Griffin, Oranmore (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,661

(22) Filed: Apr. 9, 2018

(65) Prior Publication Data
US 2018/0302514 A1  Oct. 18, 2018

Related U.S. Application Data

(63) Continuation of application No. 14/690,039, filed on Apr. 17, 2015, now Pat. No. 9,948,786.

(51) Int. Cl.
| H04M 3/42 | (2006.01) |
| H04M 3/56 | (2006.01) |
| H04L 12/18 | (2006.01) |
| H04L 29/06 | (2006.01) |
| H04L 29/08 | (2006.01) |

(52) U.S. Cl.
CPC ........ *H04M 3/567* (2013.01); *H04L 12/1827* (2013.01); *H04L 65/1093* (2013.01); *H04L 65/403* (2013.01); *H04L 67/10* (2013.01); *H04L 67/1008* (2013.01); *H04L 29/06176* (2013.01)

(58) Field of Classification Search
CPC ........................... H04M 3/567; H04L 12/1827
USPC ............................................. 379/202.01, 158
See application file for complete search history.

(56) References Cited

U.S. PATENT DOCUMENTS

| 4,460,807 A | 7/1984 | Kerr et al. |
| 4,890,257 A | 12/1989 | Anthias et al. |
| 4,977,605 A | 12/1990 | Fardeau et al. |

(Continued)

FOREIGN PATENT DOCUMENTS

| CN | 101055561 | 10/2007 |
| CN | 101076060 | 11/2007 |

(Continued)

OTHER PUBLICATIONS

Choi, Jae Young, et al; "Towards an Automatic Face Indexing System for Actor-based Video Services in an IPTV Environment," IEEE Transactions on 56, No. 1 (2010): 147-155.

(Continued)

*Primary Examiner* — William J Deane, Jr.
(74) *Attorney, Agent, or Firm* — Polsinelli PC

(57) ABSTRACT

Systems, methods, and non-transitory computer-readable storage media for directing conferences to on-premises media agents and cloud-based media agents. A centralized controller and a plurality of cloud-based media agents are disposed within a cloud or other remote or virtual network, and a plurality of on-premises media agents are provided on-premises. The centralized controller manages the directing and forwarding of conferences and is in communication with the cloud-based media agents and the on-premises media agents.

20 Claims, 6 Drawing Sheets

(56) References Cited

U.S. PATENT DOCUMENTS

| | | |
|---|---|---|
| 5,293,430 A | 3/1994 | Shiau et al. |
| 5,673,253 A * | 9/1997 | Shaffer .................. H04L 47/10 370/229 |
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,917,537 A | 6/1999 | Lightfoot et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,700,979 B1 | 3/2004 | Washiya |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 6,816,464 B1 | 11/2004 | Scott et al. |
| 6,865,264 B2 | 3/2005 | Berstis |
| 6,938,208 B2 | 8/2005 | Reichardt |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,830,814 B1 | 11/2010 | Allen et al. |
| 7,840,013 B2 | 11/2010 | Dedieu et al. |
| 7,840,980 B2 | 11/2010 | Gutta |
| 7,881,450 B1 | 2/2011 | Gentle et al. |
| 7,920,160 B2 | 4/2011 | Tamaru et al. |
| 7,956,869 B1 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,081,205 B2 | 12/2011 | Baird et al. |
| 8,140,973 B2 | 3/2012 | Sandquist et al. |
| 8,169,463 B2 | 5/2012 | Enstad et al. |
| 8,219,624 B2 | 7/2012 | Haynes et al. |
| 8,274,893 B2 | 9/2012 | Bansal et al. |
| 8,290,998 B2 | 10/2012 | Stienhans |
| 8,301,883 B2 | 10/2012 | Sundaram et al. |
| 8,340,268 B2 | 12/2012 | Knaz |
| 8,358,327 B2 | 1/2013 | Duddy |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,520,370 B2 | 8/2013 | Waitzman, III et al. |
| 8,625,749 B2 | 1/2014 | Jain et al. |
| 8,630,208 B1 | 1/2014 | Kjeldaas et al. |
| 8,638,354 B2 | 1/2014 | Leow et al. |
| 8,645,464 B2 | 2/2014 | Zimmet et al. |
| 8,675,847 B2 | 3/2014 | Shaffer et al. |
| 8,694,587 B2 | 4/2014 | Chaturvedi |
| 8,694,593 B1 | 4/2014 | Wren et al. |
| 8,706,539 B1 | 4/2014 | Mohler |
| 8,732,149 B2 | 5/2014 | Iida et al. |
| 8,738,080 B2 | 5/2014 | Nhiayi et al. |
| 8,751,572 B1 | 6/2014 | Behforooz et al. |
| 8,831,505 B1 | 9/2014 | Seshadri |
| 8,850,203 B2 | 9/2014 | Sundaram et al. |
| 8,860,774 B1 | 10/2014 | Sheeley et al. |
| 8,874,644 B2 | 10/2014 | Allen et al. |
| 8,890,924 B2 | 11/2014 | Wu |
| 8,892,646 B2 | 11/2014 | Chaturvedi |
| 8,914,444 B2 | 12/2014 | Hladik, Jr. |
| 8,914,472 B1 | 12/2014 | Lee et al. |
| 8,924,862 B1 | 12/2014 | Luo |
| 8,930,840 B1 | 1/2015 | Risko et al. |
| 8,947,493 B2 | 2/2015 | Lian et al. |
| 8,972,494 B2 | 3/2015 | Chen et al. |
| 9,003,445 B1 | 4/2015 | Rowe |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,701 B1 | 11/2015 | Petrov |
| 9,197,848 B2 | 11/2015 | Felkai et al. |
| 9,201,527 B2 | 12/2015 | Kripalani et al. |
| 9,203,875 B2 | 12/2015 | Huang et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |
| 9,268,398 B2 | 2/2016 | Tiperneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,667,799 B2 | 5/2017 | Olivier |
| 9,674,625 B2 | 6/2017 | Armstrong-Muntner |
| 9,762,709 B1 | 9/2017 | Snyder et al. |
| 9,948,786 B2 | 4/2018 | Rosenberg et al. |
| 2001/0030661 A1 | 10/2001 | Reichardt |
| 2002/0018051 A1 | 2/2002 | Singh |

(56) References Cited

U.S. PATENT DOCUMENTS

| | | |
|---|---|---|
| 2002/0059627 A1* | 5/2002 | Islam .............. H04L 29/06027 725/96 |
| 2002/0076003 A1 | 6/2002 | Zellner et al. |
| 2002/0078153 A1 | 6/2002 | Chung et al. |
| 2002/0140736 A1 | 10/2002 | Chen |
| 2002/0188522 A1 | 12/2002 | McCall et al. |
| 2003/0028647 A1 | 2/2003 | Grosu |
| 2003/0046421 A1 | 3/2003 | Horovitz et al. |
| 2003/0068087 A1 | 4/2003 | Wu et al. |
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0039051 A1* | 2/2005 | Erofeev ............. H04L 63/0236 726/4 |
| 2005/0048916 A1 | 3/2005 | Suh |
| 2005/0055405 A1 | 3/2005 | Kaminksy et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0131774 A1 | 6/2005 | Huxter |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0083305 A1 | 4/2006 | Dougherty et al. |
| 2006/0084471 A1 | 4/2006 | Walter |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0139626 A1 | 6/2007 | Saleh et al. |
| 2007/0150453 A1 | 6/2007 | Morita |
| 2007/0168444 A1 | 7/2007 | Chen et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan |
| 2008/0107255 A1 | 5/2008 | Geva et al. |
| 2008/0133663 A1 | 6/2008 | Lentz |
| 2008/0154863 A1 | 6/2008 | Goldstein |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2009/0012963 A1 | 1/2009 | Johnson |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0132949 A1 | 5/2009 | Bosarge |
| 2009/0193327 A1 | 7/2009 | Roychoudhuri et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1 | 1/2010 | Xiao et al. |
| 2010/0005402 A1 | 1/2010 | George et al. |
| 2010/0031192 A1 | 2/2010 | Kong |
| 2010/0061538 A1 | 3/2010 | Coleman et al. |
| 2010/0070640 A1 | 3/2010 | Allen et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0087745 A1 | 4/2011 | O'Sullivan et al. |
| 2011/0117535 A1 | 5/2011 | Benko et al. |
| 2011/0131498 A1 | 6/2011 | Chao et al. |
| 2011/0154427 A1 | 6/2011 | Wei |
| 2011/0230209 A1 | 9/2011 | Kilian |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0179502 A1 | 7/2012 | Farooq et al. |
| 2012/0190386 A1 | 7/2012 | Anderson |
| 2012/0192075 A1 | 7/2012 | Ebtekar et al. |
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0308202 A1 | 12/2012 | Murata et al. |

(56) References Cited

U.S. PATENT DOCUMENTS

| | | |
|---|---|---|
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |
| 2013/0027425 A1 | 1/2013 | Yuan |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0086633 A1 | 4/2013 | Schultz |
| 2013/0090065 A1 | 4/2013 | Fisuneko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage |
| 2013/0219278 A1 | 8/2013 | Rosenberg |
| 2013/0222224 A1 | 8/2013 | Booms et al. |
| 2013/0225080 A1 | 8/2013 | Doss et al. |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0252669 A1 | 9/2013 | Nhiayi |
| 2013/0263020 A1 | 10/2013 | Heiferman et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0325970 A1 | 12/2013 | Roberts et al. |
| 2013/0329865 A1 | 12/2013 | Ristock |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare Sanjay et al. |
| 2014/0040819 A1 | 2/2014 | Duffy |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki et al. |
| 2014/0111597 A1 | 4/2014 | Anderson et al. |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0195557 A1 | 7/2014 | Oztaskent et al. |
| 2014/0198175 A1 | 7/2014 | Shaffer et al. |
| 2014/0237371 A1 | 8/2014 | Klemm et al. |
| 2014/0253671 A1 | 9/2014 | Bentley et al. |
| 2014/0280595 A1 | 9/2014 | Mani |
| 2014/0282213 A1 | 9/2014 | Musa et al. |
| 2014/0296112 A1 | 10/2014 | O'Driscoll et al. |
| 2014/0298210 A1 | 10/2014 | Park et al. |
| 2014/0310246 A1* | 10/2014 | Vijayan ............... G06F 11/1469 707/679 |
| 2014/0317561 A1 | 10/2014 | Robinson et al. |
| 2014/0337840 A1 | 11/2014 | Hyde et al. |
| 2014/0358264 A1 | 12/2014 | Long et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Makatomi et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0113050 A1* | 4/2015 | Stahl ................... H04L 67/1002 709/203 |
| 2015/0113369 A1 | 4/2015 | Chan et al. |
| 2015/0128068 A1 | 5/2015 | Kim |
| 2015/0172120 A1 | 6/2015 | Dwarampudi |
| 2015/0178626 A1 | 6/2015 | Pielot et al. |
| 2015/0215365 A1 | 7/2015 | Shaffer et al. |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0350126 A1 | 12/2015 | Xue |
| 2015/0373063 A1 | 12/2015 | Vashishtha et al. |
| 2015/0373414 A1 | 12/2015 | Kinoshita |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0165056 A1 | 6/2016 | Bargetzi et al. |
| 2016/0173537 A1 | 6/2016 | Kumar |
| 2016/0182580 A1 | 6/2016 | Nayak |
| 2016/0266609 A1 | 9/2016 | McCracken |
| 2016/0269411 A1 | 9/2016 | Malachi |
| 2016/0274977 A1* | 9/2016 | Vijayan ............... G06F 11/1469 |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0321347 A1 | 11/2016 | Zhou et al. |
| 2017/0000644 A1 | 1/2017 | Harris et al. |
| 2017/0006162 A1 | 1/2017 | Bargetzi et al. |
| 2017/0070706 A1 | 3/2017 | Ursin et al. |
| 2017/0093874 A1 | 3/2017 | Uthe |
| 2017/0104961 A1 | 4/2017 | Pan et al. |
| 2017/0171260 A1 | 6/2017 | Jerrard-Dunne et al. |
| 2017/0324850 A1 | 11/2017 | Snyder et al. |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| WO | WO 98/55903 | 12/1998 |
| WO | WO 2008/139269 | 11/2008 |
| WO | 20120167262 | 12/2012 |
| WO | 20140118736 | 8/2014 |

(56) References Cited

OTHER PUBLICATIONS

Cisco Systems, Inc. "Cisco webex: WebEx Meeting Center User Guide for Hosts, Presenters, and Participants" © 1997-2013, pp. 1- 394 plus table of contents.
Cisco Systems, Inc., "Cisco Webex Meetings for iPad and iPhone Release Notes," Version 5.0, Oct. 2013, 5 pages.
Cisco Systems, Inc., "Cisco Unified Personal Communicator 8.5", 2011, 9 pages.
Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.
Grothaus, Michael, "How Interactive Product Placements Could Save Television," Jul. 25, 2013, 4 pages.
Hannigan, Nancy Kruse, et al., The IBM Lotus Samteime VB Family Extending the IBM Unified Communications and Collaboration Strategy (2007), available at http://www.ibm.com/developerworks/lotus/library/sametime8-new/, 10 pages.
Hirschmann, Kenny, "TWIDDLA: Smarter Than The Average Whiteboard," Apr. 17, 2014, 2 pages.
Nyamgondalu, Nagendra, "Lotus Notes Calendar and Scheduling Explained!" IBM, Oct. 18, 2004, 10 pages.
Schreiber, Danny, "The Missing Guide for Google Hangout Video Calls," Jun. 5, 2014, 6 pages.
Shervington, Martin, "Complete Guide to Google Hangouts for Businesses and Individuals," Mar. 20, 2014, 15 pages.
Shi, Saiqi, et al, "Notification That a Mobile Meeting Attendee Is Driving", May 20, 2013, 13 pages.
Author Unknown, "A Primer on the H.323 Series Standard," Version 2.0, available at httpIAshvw.packetzr-Jr.com/voipM323ipapr-Jrsiprirmnv, retrieved on Dec. 20, 2006, 17 pages.
Author Unknown, "Active screen follows mouse and dual monitors," KDE Community Forums, Apr. 13, 2010, 3 pages.
Author Unknown, "Implementing Media Gateway Control Protocols" A RADVision White Paper, Jan. 27, 2002, 16 pages.
Averusa, "Interactive Video Conferencing K-12 applications," "Interactive Video Conferencing K-12 applications" copyright 2012. httpliwww.averusa.com/education/downloadsliwc brochure goved.pdf (last accessed Oct. 11, 2013).
Cisco Systems, Inc., "Cisco WebEx Meetings Server System Requirements release 1.5." 30 pages, Aug. 14, 2013.
Cisco White Paper, "Web Conferencing: Unleash the Power of Secure, Real-Time Collaboration," pp. 1-8, 2014.
Clarke, Brant, "Polycom Announces RealPresence Group Series," "Polycom Announces RealPresence Group Series" dated Oct. 8, 2012 available at http://www.323.tvinewsiDolycorn-realpresencegroup-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (excerpt), httoliwww.iste.orgidoesiexcerpts/VIDCO2-excerptpdf (last accessed Oct. 11, 2013), 2009.
Epson, "BrightLink Pro Projector," BrightLink Pro Projector. http://www.e.oson.cornieqi) intatorers 'Landin 1bri hilink-ro-interactive-Dro'ec rs.cio?reft--vari brightlink-pro—dated 2013 (last accessed Oct. 11, 2013).
Infocus, "Mondopad," Mondopad. http://www.infocus.cornisitesidefaultifilesiInFocus-MondoDad-INF5520a-INF7021-Datasheet-EN xif (last accessed Oct. 11, 2013), 2013.
MacCormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at htto://www.informationweek.cornneecorniunifiedcommunicationsipolvcom-acids-tablet-ideocoriferencinal231900680 dated Oct. 12, 2011 (last accessed Oct. 11, 2013).
Nu-Star Technologies, "Interactive Whiteboard Conferencing," Interactive WhiteboardConferencing. http://www.nu-star.comlinteractive-conf.php dated 2013 (last accessed Oct. 11, 2013).
Polycom, "Polycom RealPresence Mobile: Mobile Telepresence & Video Conferencing," http://www.Dolycorn.corn/Droducts-services/hd-teleoresence-video-conferencingirea4wesencemobile.iitrrti#stabl (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.Dolycorn.corn/companyinews/press-releases/2011/201110272.html—dated Oct. 27, 2011.
Polycom, "Polycom UC Board, Transforming ordinary surfaces into virtual whiteboards" 2012, Polycom, Inc., San Jose, CA, rift llw,,, ,,Aev.uat con-1/ Afibol, corn/ c inorn-uc-board- datasheet.pdf, (last accessed Oct. 11, 2013).
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
TNO, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama—httol/www.vidyo comiproductsivdyopanorama! dated 2013 (last accessed Oct. 11, 2013).
International Search Report and Written Opinion for PCT Application No. PCT/US2016/027551, dated Jun. 24, 2016, 13 pages.

* cited by examiner

HANDLING CONFERENCES USING HIGHLY-DISTRIBUTED AGENTS

CROSS REFERENCE TO RELATED APPLICATIONS

The instant application is a continuation of U.S. application Ser. No. 14/690,039 filed Apr. 17, 2015 entitled HANDLING CONFERENCES USING HIGHLY-DISTRIBUTED AGENTS, the contents of which are expressly incorporated by reference herein in its entirety.

TECHNICAL FIELD

The present technology pertains to handling conferences by media agents.

BACKGROUND

Conferences, such as a teleconference having multiple callers requesting to join the teleconference, require a plurality of media agents, such as MCUs, to carry out a conference with multiple parties. Existing teleconferencing systems are either on-premises or in the cloud. It is difficult to anticipate the amount of resources needed for conferences, so companies are often forced to purchase the amount of on-premises or cloud capacity needed for peak capacity.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
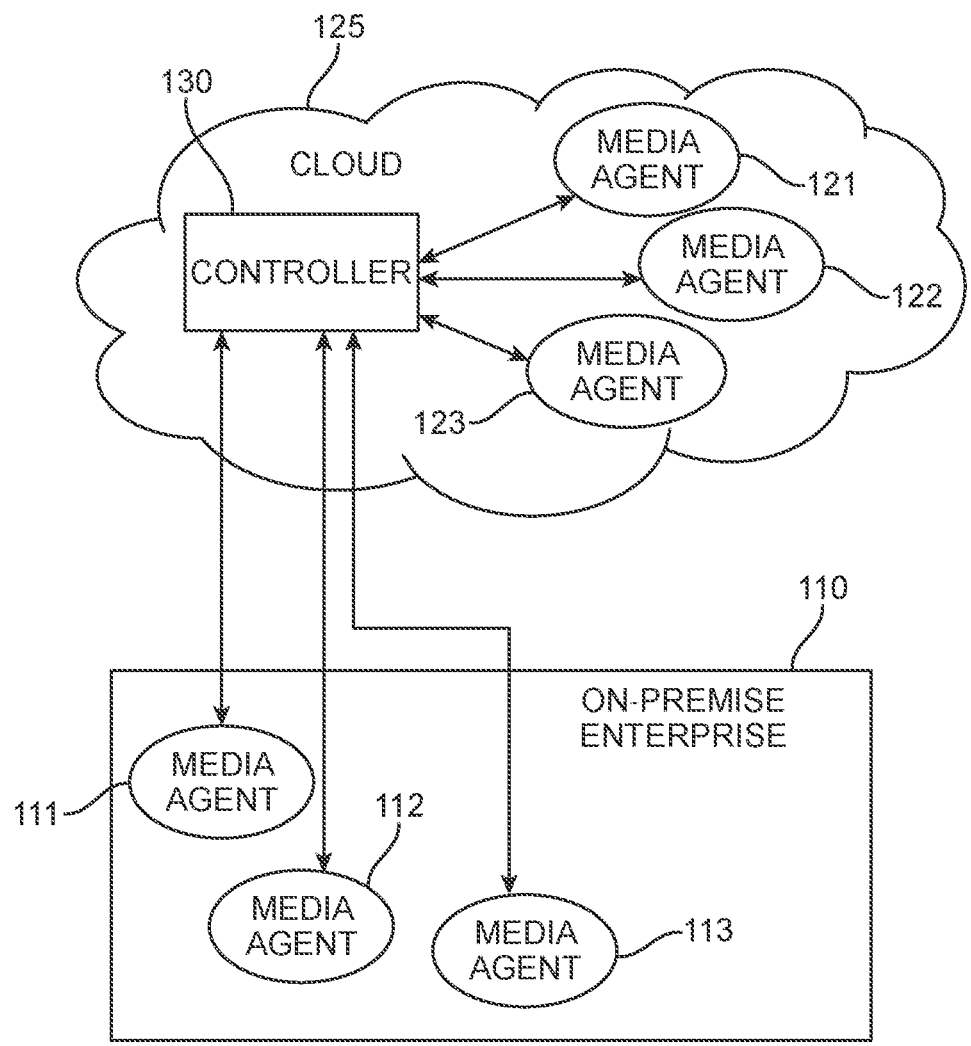
FIG. 1 illustrates an example block diagram according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

An elastic model for handling conferences includes a plurality of on-premises media agents and a plurality of cloud-based media agents that are used together to perform conferences. A "cloud" or other remote network includes a plurality of cloud-based media agents and a centralized controller. The centralized controller receives requests to join conferences. The controller can be cloud-based or can be based at any location as a standalone entity that is securely reachable over a network. The centralized controller provides a requester with instructions for attempting a first connection. This can be an attempt to connect to a media agent on-premises or cloud-based. If the first connection is not made, then a second connection can be attempted. The first connection may not be made due to several factors, such as the media agents meeting or exceeding capacity. A second connection attempt can then be made to an on-premises or cloud-based media agent. The controller can manage the capacity of the media agents, or a stun load balancer can be at the front end of each group of media agents to monitor the capacity of the media agents.

Description

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for an elastic model for handling conferences to provide adequate resources for average and peak bandwidth using a cloud-based controller and to provide conferencing capabilities to clients seeking to join a conference when media agents on-premises and/or media agents in the cloud are at capacity. Disclosed are systems, methods, and computer-readable storage media for clients of conferences to be handled by on-premises and cloud-based media agents. A cloud-based controller receives incoming requests to join conferences and selects an on-premises media agent or a cloud-based media agent to handle the request, depending upon a number of factors, such as resource bandwidth, call type, caller information and other call-related data. For example, all requests to join conferences may go to on-premises media agents until capacity is met or exceeded, and then the conferences may be handled by cloud-based media agents so the client can still join the conference even when the media agents on-premises have reached capacity. Another example is for conferences of a first media type (e.g., audio conferences) to be handled by cloud-based media agents, and to direct conferences of a second media type (e.g., video conferences) to be handled by on-premises media agents. In still a further example, the controller has logic that determines which media agents are more secure, and accordingly directs secure conferences to the secure media agents.

A brief introductory description of exemplary systems and networks, as illustrated in FIG. 1, is disclosed herein. A detailed description of the various system flows, related concepts, and exemplary variations, will then follow. These variations shall be described herein as the various embodiments are set forth. The disclosure now turns to FIG. 1.

FIG. 1 illustrates an example block diagram according to some aspects of the subject technology. An on-premises enterprise 110 has a plurality of on-premises media agents 111, 112 and 113. Media agents perform media (e.g., audio, video and share) packet processing operations in support of conference sessions in which clients participate, such as, but not limited to, media packet mixing, switching, encoding, decoding and transcoding. Although only three media agents are shown and described for illustrative and descriptive purposes, it should be understood that any number of media agents can be employed to achieve the desired conferencing capabilities for a particular premise. Also, although only a single enterprise 110 is shown having one cluster of agents 111, 112, 113, the techniques are likewise applicable to any number of enterprises, each having any number of media agents or clusters of media agents. In accordance with the techniques herein, enterprises having multiple locations that each have a plurality of media agents and are geographically distributed can employ the conferencing system herein to control overall enterprise conferencing capabilities for all locations using a cloud-based controller. Audio, video and sharing capabilities are handled using the cloud-based controller.

In accordance with some aspects of the subject technology, an enterprise (e.g., a company) can purchase sufficient capacity for average demand on-premises, instead of peak demand, and purchase capacity in the cloud for peak capacity, to be used on an as-needed basis. In this manner, a fixed capacity of licensed computing is deployed on-premises at the enterprise, and the remaining capacity can be provided by the cloud resources.

A conference session (also referred to more generally as a "conference") may involve the exchange of one or more of audio, video and sharing of resources (such as screen or application share) between any number of clients as well as the sharing of content by one participant to one or more other clients. Such shared content may include documents, presentations, audio content, video content, etc. A conference sessions including screen and/or application share can be handled by the cloud-based controller in accordance with the teachings herein. The cloud controller can thus handle conferences with audio, video and sharing capabilities. The sharing capabilities can be encoded and handled as video in at least some embodiments.

A controller 130 resides in the "cloud" 125 which can be an appropriate data center. To control the system, the controller 130 performs control plane signal operations/functions using such features and functions afforded by, for example but not limited to, the Session Initiation Protocol (SIP), H323 access, rosters, and conference control options (including, e.g., mute, kick, etc.). The controller also performs orchestration of the conferences by controlling the connections between on-premises media agents and cloud-based media agents to ensure that a particular conference is fully connected and provides the necessary audio and video processing functions. The controller can have logic that allows it to select on-premises media agents or cloud-based media agents in accordance with some aspects of the subject technology.

The cloud 125 also includes a plurality of media agents 121, 122 and 123 that are cloud-based and reside within the cloud 125 as opposed to on-premises. Although only three media agents are shown and described for illustrative and descriptive purposes, it should be understood that any number of media agents can be employed to achieve the desired conferencing capabilities for a particular premise through the use of cloud-based media agents in addition to on-premises media agents. In this manner, an enterprise can utilize the on-premises media agents and the cloud-based media agents to accommodate their conferencing needs without requiring an enterprise to maintain sufficient media agents on-premises to satisfy peak conferencing needs, as the cloud-based media agents can be used on an as-needed basis, or depending upon particular factors that the enterprise has determined to control the media agent that handle the conferences.

The system of FIG. 1 provides a dynamic, elastic technique to allow for maximum utilization of collaboration in resources between on-premises and the cloud. As will be described in detail below, techniques presented herein dynamically configure highly-distributed resources in a conference system, including the cloud-based controller, the on-premises media agents and the cloud-based media agents to support conference sessions initiated by clients and direct conferences to the appropriate on-premises or cloud-based media agents. The resources are referred to as "highly-distributed" to describe geographically distributed resources.

In support of these techniques, the controller 130, on-premises media agents 111, 112, 113 and cloud-based media agents 121, 122, 123 implement and interact with each other using a variety of communication protocols to establish conference sessions and exchange media streams including packets of data in conference sessions. Such communication protocols include, but are not limited to: the Interactive Connectivity Establishment (ICE) protocol; the Session Traversal Utilities for Network Address Translation/Translator (NAT) (STUN) protocol modified or extended to use STUN URLs, in accordance with techniques presented herein; the User Datagram Protocol (UDP); and the Real-Time Transport protocol (RTP). The techniques described herein use the aforementioned protocols by way of example, only; other similar protocols may also be used instead of or in combination with the mentioned protocols, as would be appreciated by one of ordinary skill in the relevant arts having access to the description presented herein.

The on-premises media agents 111, 112, 113 and cloud-based media agents 121, 122, 123 may be any number of media agents, up to the tens of thousands, and can be distributed geographically around the world. Similarly, clients seeking to join a conference may be located anywhere in the world. As such, the conference system is referred to as "highly distributed." A challenge to such a distributed arrangement is to construct a "best" media topology for assigning clients to conferences using on-premises media agents or cloud-based media agents.

Techniques presented herein address the challenges of assigning clients to conferences based upon a number of factors. For example, an enterprise may wish to control the use of media agents based on the type of data being exchanged in the conference. The enterprise may desire to have all audio conferences handled by on-premises media agents while all video conferences are handled by cloud-based media agents, or vice versa, so that the appropriate media agents can handle the various conferences. As another example, the enterprise may wish to simply set up their conferencing capabilities based on capacity of the media agents so that the on-premises media agents are used first until there are no longer any media agents available on-premises, and then the cloud-based media agents can be used when the media agents on-premises have reached capacity. Yet another example is to employ on-premises media agents for on-premises clients, and to employ cloud-based media agents for clients that are not on-premises so that the on-premises clients use the on-premises media agents and remote clients use the cloud-based media agents. And yet another example is handling conferences based on the security of the conference, so that secure conferences are handled by on-premises media agents, and non-secure conferences are handled by cloud-based media agents, or vice-versa with the non-secure conferences handled by on-premises media agents and secure conferences handled by cloud-based media agents. There are several decisions in the controller logic to control routing of conferences to on-premises media agents and cloud-based media agents. The controller logic can determine which media agents are more secure and direct conferences accordingly. For example, if the on-premises media agents are more secure, the secure conferences are directed to the on-premises media agents, and if the cloud-based media agents are more secure, the secure conferences are directed to cloud-based media agents. The factors for determining how conferences are directed to cloud-based media agents or on-premises media agents can be chosen by the enterprise or pre-selected by the manufacturer, or may be available for on-demand changes depending upon the needs and desired functionality in conferencing of the enterprise.

The advantages of a conferencing system that includes both on-premises media agents and cloud-based media agents include limitless conferencing capabilities, meaning there is no limit on the number of participants, and the conferencing system is able to satisfy the needs of traditional on-premises conferencing and cloud-based conferencing individually, as well as combined, by combining the two conferencing mechanisms into a single conferencing system.

Figure 2:
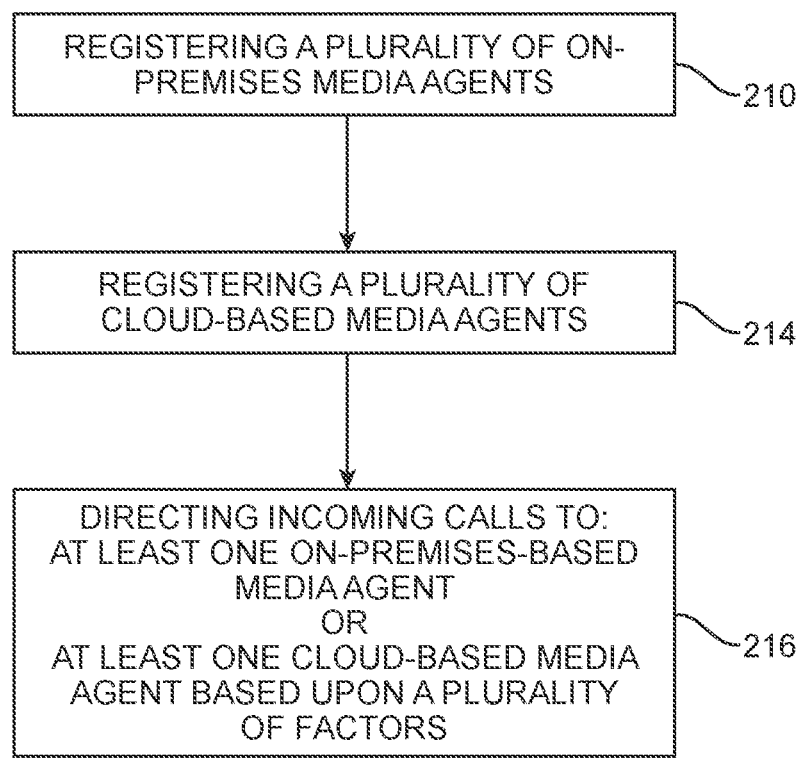
FIG. 2 illustrates an example method embodiment.

FIG. 2 illustrates an example method embodiment. The procedure of FIG. 2 commences by 210 registering a plurality of on-premises media agents with a cloud-based controller. The plurality of on-premises media agents can, for example, be the media agents 111, 112, 113 shown in FIG. 1, and can include a single on-premises media agent up to any number of media agents residing on-premises at an enterprise. At 214 a plurality of cloud-based media agents are registered with the cloud-based controller. At 216, incoming requests to join a teleconference, which can be referred to generally as "calls", can be any request to join a conference, such as an audio or video teleconference, are handled by at least one on-premises media agent or at least one cloud-based media agent based upon a plurality of factors. The factors for controlling the handling of incoming requests to join a conference can include capacity for more clients at the on-premises media agents, security of the conference, media type of the conference, and other factors described herein and known in the relevant art as pertaining to conferencing sessions and conferencing systems. The conferences can be general teleconferences, such as audio or video conferences, and include multi-media conferences.

The handling of conferences by cloud-based media agents and on-premises media agents can be seamless to the clients. There are two approaches for directing conferences, a first in which the controller manages the switch. A second is the switch is handled by the client and a load balancer.

Figure 3:
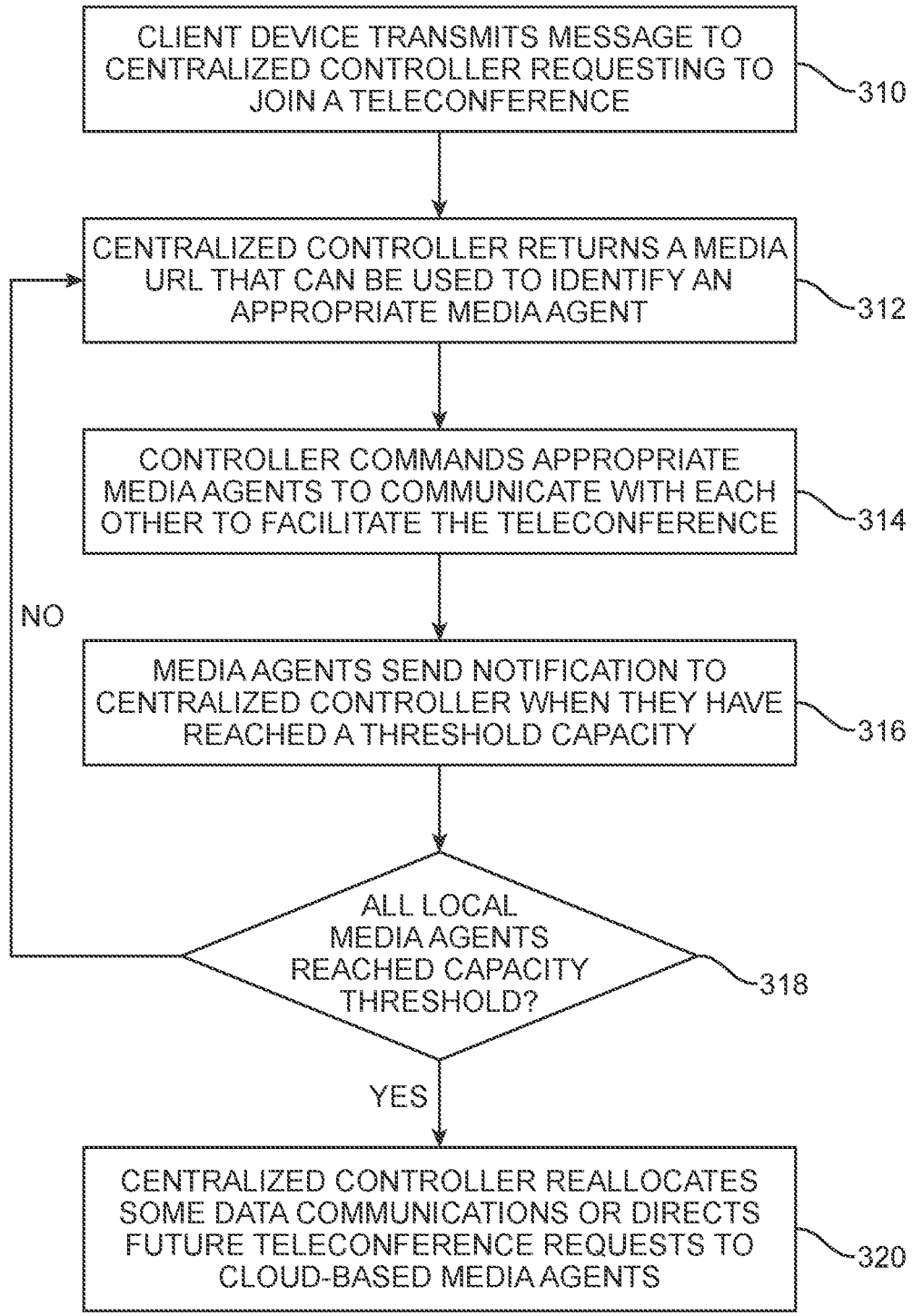
FIG. 3 illustrates an example method embodiment.

FIG. 3 illustrates an example method embodiment for handling conferences in accordance with some aspects of the subject technology where the controller manages the switching of conferences. In this embodiment, conferences are handled by media agents that are located on-premises until they have reached maximum capacity, and then the cloud-based controller handles the conferences or reallocates some data to cloud-based media agents. The capacity threshold can indicate that the media agents cannot handle further audio or video streams. If the capacity threshold is met, then the centralized controller can locate cloud-based media agents to handle media requests from new clients requesting to join the conference.

As described herein, the threshold capacity is only one factor that can be used in determining the media agent that handles a requested conference. The handling can also occur based on the type of security of the conference, such that the secure conferences are handled by media agents that are deemed to be the most secure. For example, the controller logic can determine the media agents that are the most secure, and direct the secure calls to the most secure media agents. The threshold capacity is used as one example factor for determining the handling of conferences in the example embodiment of FIG. 3.

At 310, when a client device desires to join a conference, the client device transmits a message to a centralized controller requesting to join a teleconference (including an audio conference or a video conference). The centralized controller is cloud-based and resides in the cloud in the example embodiment. At 312, the centralized controller returns a media URL that can be used to identify an appropriate media agent for the client device to connect to the conference. The media agent identified in the media URL may be a cloud-based media agent or an on-premises media agent, depending upon the logic of the cloud-based controller for handling conferences by the appropriate media agents. The controller can optionally further command appropriate media agents to communicate with each other to facilitate the conference at 314. At 316, the media agents send a notification to the controller when they have reached a threshold capacity. At 318 it is determined by the cloud-based controller if all local media agents have reached their capacity threshold. When all on-premises media agents have not reached their threshold capacity at 318, the centralized controller returns to 312 and continues to provide media URLs to clients to be handled by on-premises media agents. When all on-premises media agents have reached their threshold capacity at 318, the centralized controller reallocates some data communications or directs future conference requests to cloud-based media agents at 320.

Figure 4:
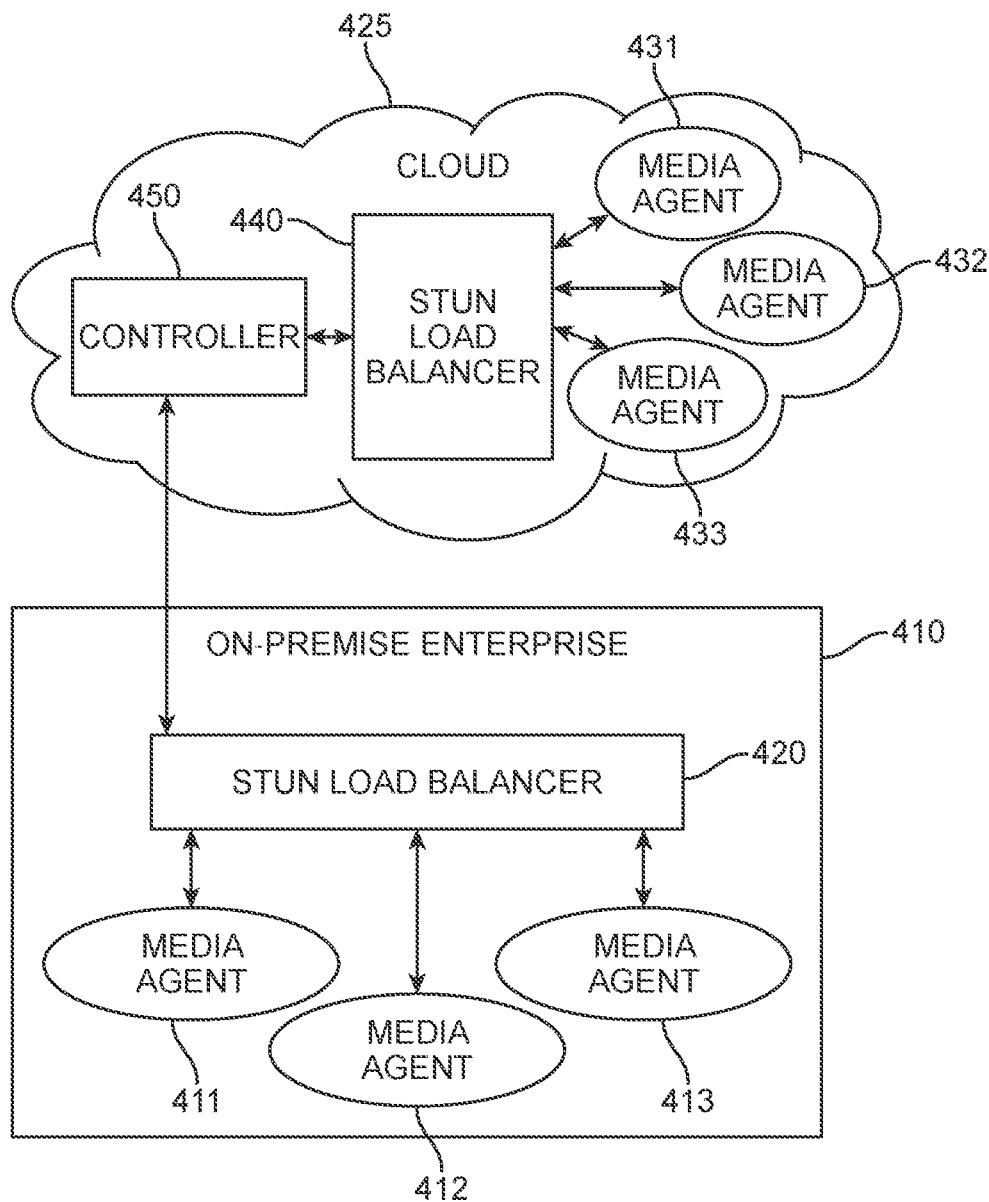
FIG. 4 illustrates an example block diagram including a load balancer fronting each group of media agents, according to some aspects of the subject technology.

FIG. 4 illustrates an example block diagram including a STUN [Simple Traversal of UDP (Universal Datagram Protocol) through NATs (Network Address Translators)] load balancer (also referred to as a "load balancing server") fronting each group of media agents, according to some aspects of the subject technology. Although depicted as a STUN load balancer, it should be understood that any load balancer can be implemented in accordance with the teachings of the subject technology. Further, it is also contemplated that in alternate embodiments, the load balancer functionality can be absorbed into the media agent. Accordingly, when the load balancer receives the join request, it interrogates a shared database amongst the load balancers, and determines which if any media agent is already servicing the conference. If there is already one assigned, the load balancer redirects the client to that media agent. If not, the load balancer redirects the client to a media agent with available capacity.

The techniques presented herein dynamically configure highly-distributed resources to support conference sessions initiated by callers on an as-needed basis. In support of these techniques, the controller, media agents, callers and load balancers, implement and interact with each other using a variety of communication protocols to establish conference sessions and exchange media streams containing packets of data in the conference sessions. Such communication protocols include, but are not limited to: the Interactive Connectivity Establishment (ICE) protocol; the STUN protocol modified/extended to use STUN URLs, in accordance with techniques presented herein; the User Datagram Protocol (UDP) and the Real-Time Transport Protocol (RTP). The techniques described herein use the aforementioned protocols by way of example only; other similar protocols may also be used instead of or in combination with the mentioned protocols, as would be appreciated by one of ordinary skill in the relevant arts having access to the description presented herein.

Figure 5:
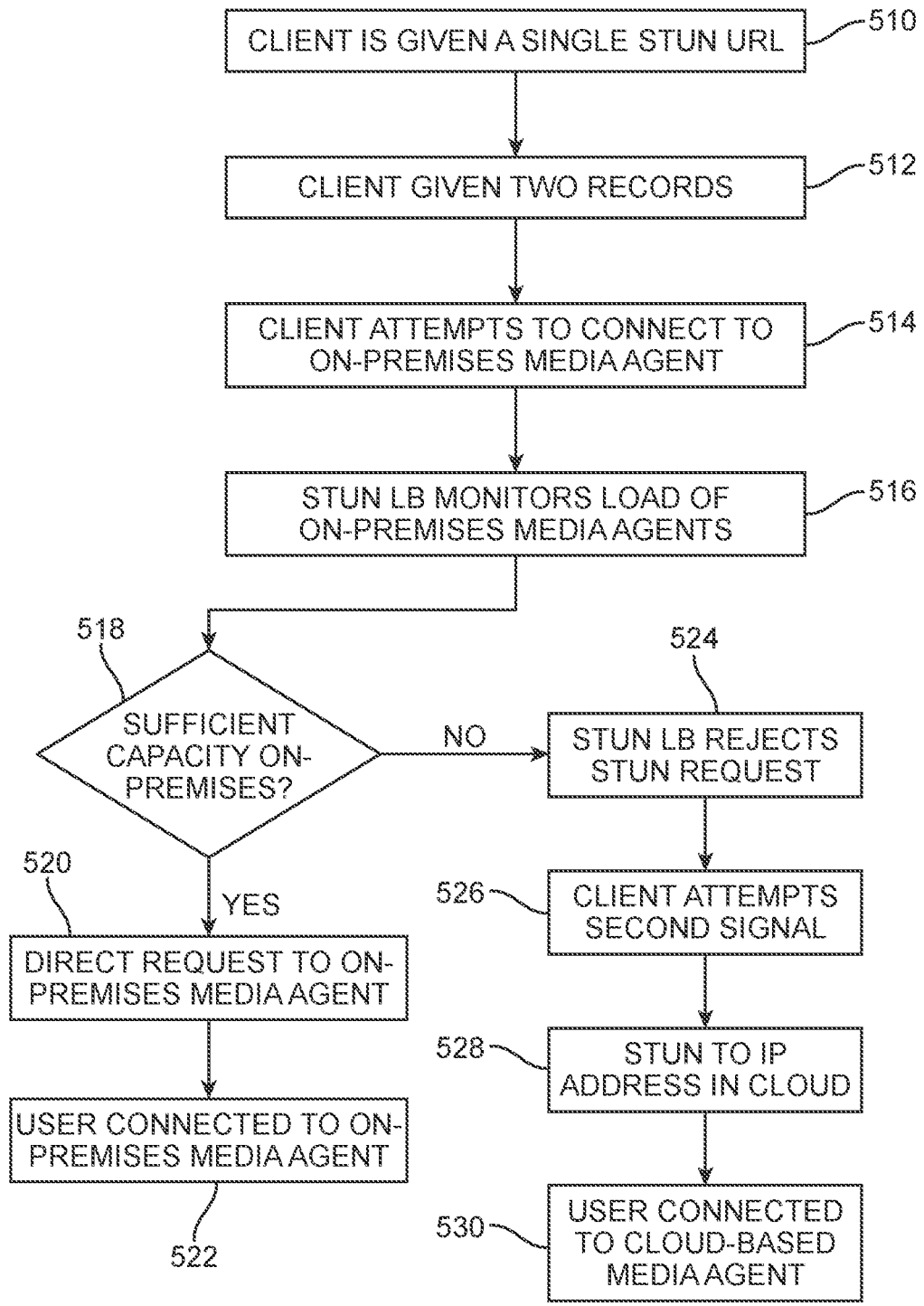
FIG. 5 Illustrates an example method embodiment.

FIG. 5 illustrates an example method embodiment for directing conferences using, for example, the conference system including STUN load balancers as shown in FIG. 4. At 510, when a client connects to the controller, the client is given a single STUN URL 510. When the client resolves this DNS from within the boundaries of the enterprise, it results in two distinct records at 512. The first record is a VIP (Virtual IP address) that points to a cluster of cloud-based agents. The other record, at a higher priority, points to a cluster of media agents on-premises. Fronting each of these clusters is a STUN load balancer as shown, however it should be understood that any load balancer can be implemented and/or that the load balancing functionality can be absorbed into the media agent itself.

At 514 the client uses the STUN to connect with higher priority to the on-premises media agent. At 516, the STUN load balancer monitors the load of the cloud-based media agents. At 518, the STUN load balancer determines if there is sufficient capacity for the on-premises media agents. When there is sufficient capacity, the request is handled by an on-premises media agent at 520 and then the user is connected to an on-premises media agent at 522. When there is not sufficient capacity at 218, the STUN load balancer can reject the STUN request at 524, with an error response which indicates a temporary capacity failure. The client uses this as a signal to instead try the second IP address at 526. The client device performs STUN to the second IP address at 528, which is a cloud-based media agent. Since there is enough capacity in the cloud, the load balancer can direct the request to an available media agent and the STUN transaction completes successfully. At 530 the client is connected to a cloud-based media agent.

The benefit of this example embodiment shown in FIG. 5 is that it does not require the controller to know the available capacity of the media agents and thus scales to a larger number of clusters worldwide. This technique also works particularly well with split-horizon DNS where the STUN URL would return two VIPs for resolutions performed within the enterprise boundary, but only one (the cloud VIP) when the client is outside of the boundary of the enterprise. This model is primarily concerned with implementing cloud-based resources to account for on-premises media agents exceeding capacity. It is also possible for an organization to utilize available on-premises resources from a cloud-based meeting.

In another example embodiment, the handling of conferences by cloud-based media agents and on-premises media agents may be based on media modality rather than exceeding capacity of the media agents. For example, an on-premises meeting may elect to direct conferences of a specific media type or combination of modalities to the cloud while maintaining other resources on-premises. The cloud controller can be provided with logic to determine the best mode of directing conferences based upon the information associated with a particular conference. For example, if an audio conference is requested, the audio conference is handled by a first group of media agents, if a video conference is requested, the video conference is handled by a second group of media agents, and if a sharing conference is requested, the sharing conference is handled by a third group of media agents.

Figure 6A:
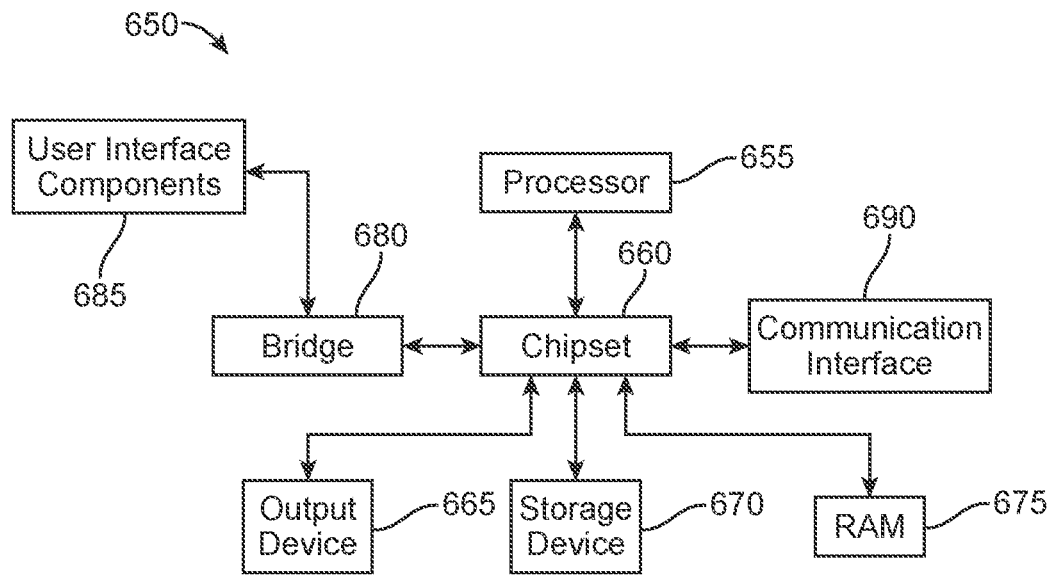
FIGS. 6A and 6B illustrate example system embodiments according to some aspects of the subject technology.
Figure 6B:
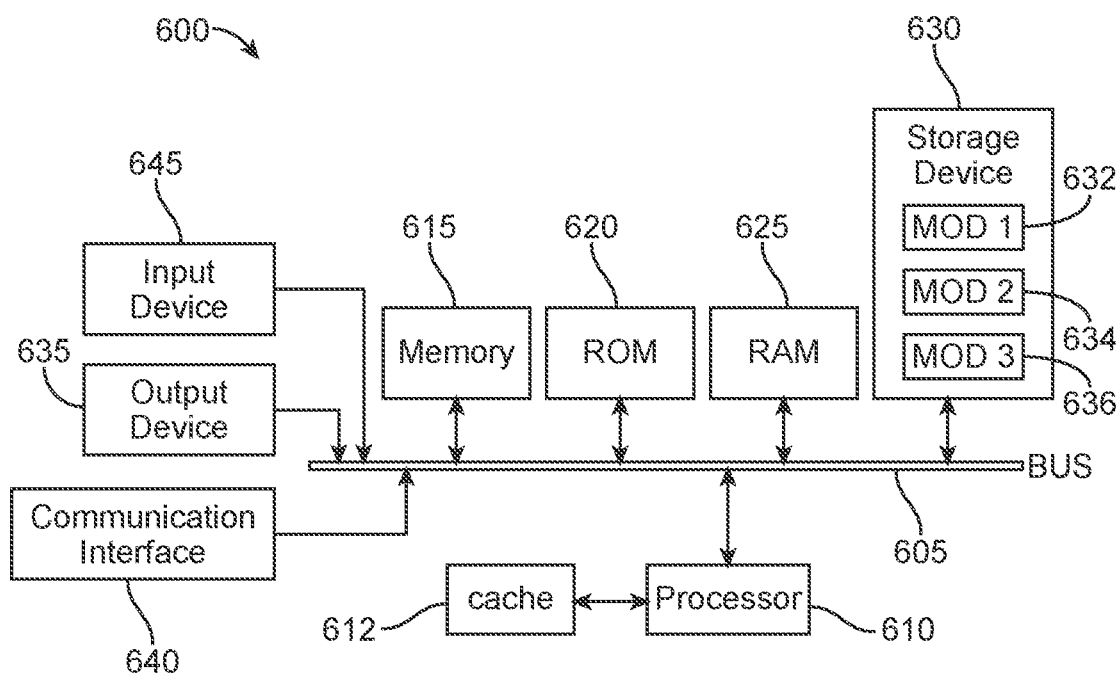

FIG. 6A, and FIG. 6B illustrate example system embodiments according to some aspects of the subject technology. The more appropriate embodiment will be apparent to those of ordinary skill in the art when practicing the present technology. Persons of ordinary skill in the art will also readily appreciate that other system embodiments are possible.

FIG. 6B illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6A illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
sending from a client device a request to join a conference at a cloud-based controller;
storing, in response to a response from the controller, (a) a first address of a cluster of on-premises media agents disposed at a physical location of an enterprise and (b) a second address of cloud-based media agents disposed at a cloud location that is remote from the physical location of the enterprise;
selecting at least one on-premises media agent or at least one cloud-based media agent to handle the request, comprising:
selecting the first address in response to the cluster of on-premises media agents having sufficient capacity to handle the request; and
selecting the second address in response to the cluster of on-premises media agents lacking sufficient capacity to handle the request.

2. The method of claim 1, further comprising receiving, in response to the sending, a Simple Traversal of UDP (Universal Datagram Protocol) through NATs (Network Address Translators) (STUN) address of a STUN load balancer.

3. The method of claim 2, further comprising creating, in response to the receiving, the first and the second address.

4. The method of claim 3, further comprising setting the first address to a higher priority than the second address.

5. The method of claim 1, wherein the selecting at least one on-premises media agent or at least one cloud-based media agent to handle the request comprises determining whether the cluster of on-premises media agents has enough available capacity to handle the request.

6. The method of claim 5, wherein the selecting the first address is in response to at least a positive result of the determining.

7. The method of claim 5, wherein the selecting the second address is in response to at least a negative result of the determining.

8. A device comprising:
a memory storing instructions;
a processor programmed to execute the instructions to perform operations comprising:
sending from a client device a request to join a conference at a cloud-based controller;
storing, in response to a response from the controller, (a) a first address of a cluster of on-premises media agents disposed at a physical location of an enterprise and (b) a second address of cloud-based media agents disposed at a cloud location that is remote from the physical location of the enterprise;
selecting at least one on-premises media agent or at least one cloud-based media agent to handle the request, comprising:
selecting the first address in response to the cluster of on-premises media agents having sufficient capacity to handle the request; and
selecting the second address in response to the cluster of on-premises media agents lacking sufficient capacity to handle the request.

9. The device of claim 8, the operations further comprising receiving, in response to the sending, a Simple Traversal of UDP (Universal Datagram Protocol) through NATs (Network Address Translators) (STUN) address of a STUN load balancer.

10. The device of claim 9, the operations further comprising creating, in response to the receiving, the first and the second address.

11. The device of claim 10, the operations further comprising setting the first address to a higher priority than the second address.

12. The device of claim 8, wherein the selecting at least one on-premises media agent or at least one cloud-based media agent to handle the request comprises determining whether the cluster of on-premises media agents has enough available capacity to handle the request.

13. The device of claim 12, wherein the selecting the first address is in response to at least a positive result of the determining.

14. The device of claim 12, wherein the selecting the second address is in response to at least a negative result of the determining.

15. A non-transitory computer readable media storing instructions that, when executed by a device, cause the device to perform operations comprising:
a memory storing instructions;
a processor programmed to execute the instructions to perform operations comprising:
sending from a client device a request to join a conference at a cloud-based controller;
storing, in response to a response from the controller, (a) a first address of a cluster of on-premises media agents disposed at a physical location of an enterprise and (b) a second address of cloud-based media agents disposed at a cloud location that is remote from the physical location of the enterprise;
selecting at least one on-premises media agent or at least one cloud-based media agent to handle the request, comprising:
selecting the first address in response to the cluster of on-premises media agents having sufficient capacity to handle the request; and
selecting the second address in response to the cluster of on-premises media agents lacking sufficient capacity to handle the request.

16. The media of claim 15, the operations further comprising receiving, in response to the sending, a Simple Traversal of UDP (Universal Datagram Protocol) through NATs (Network Address Translators) (STUN) address of a STUN load balancer.

17. The media of claim 16, the operations further comprising creating, in response to the receiving, the first and the second address.

18. The media of claim 17, the operations further comprising setting the first address to a higher priority than the second address.

19. The media of claim 15, wherein the selecting at least one on-premises media agent or at least one cloud-based media agent to handle the request comprises determining whether the cluster of on-premises media agents has enough available capacity to handle the request.

20. The media of claim 19, wherein the selecting the first address is in response to at least a positive result of the determining.

* * * * *